(12) United States Patent
Kaviani

(10) Patent No.: US 8,831,064 B1
(45) Date of Patent: Sep. 9, 2014

(54) METHOD OF AND CIRCUIT FOR GENERATING A SPREAD SPECTRUM CLOCK SIGNAL

(75) Inventor: Alireza S. Kaviani, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 2106 days.

(21) Appl. No.: 11/818,102

(22) Filed: Jun. 13, 2007

(51) Int. Cl.
*H04B 1/00* (2006.01)

(52) U.S. Cl.
USPC .......................... 375/134; 375/132; 375/133

(58) Field of Classification Search
USPC ........................................................ 375/134
See application file for complete search history.

(56) References Cited

U.S. PATENT DOCUMENTS

| | | | |
|---|---|---|---|
| 6,756,822 B1 | 6/2004 | Kaviani | |
| 7,071,751 B1 | 7/2006 | Kaviani | |
| 7,242,223 B1 * | 7/2007 | Alon | 327/39 |
| 2003/0227982 A1 * | 12/2003 | Chen et al. | 375/302 |
| 2004/0012415 A1 * | 1/2004 | Kouzuma | 327/113 |
| 2007/0025419 A1 * | 2/2007 | Greenberg | 375/130 |
| 2007/0035428 A1 * | 2/2007 | Badaroglu | 341/143 |
| 2007/0139980 A1 * | 6/2007 | Yang et al. | 363/41 |
| 2007/0172014 A1 * | 7/2007 | Moriwaki et al. | 375/376 |
| 2007/0211819 A1 * | 9/2007 | Greenberg | 375/295 |
| 2007/0291620 A1 * | 12/2007 | Yu et al. | 369/116 |
| 2008/0260071 A1 * | 10/2008 | Sidiropoulos et al. | 375/334 |
| 2009/0073827 A1 * | 3/2009 | Hsieh et al. | 369/47.5 |

OTHER PUBLICATIONS

U.S. Appl. No. 11/170,020, by Maheen A. Samad, "A Circuit for and Method of Changing a Frequency in a Circuit" filed Jun. 29, 2005, 30 pages, available from Xilinx, Inc., 2100 Logic Drive, San Jose, CA 95124.

* cited by examiner

*Primary Examiner* — Erin File
(74) *Attorney, Agent, or Firm* — John J. King

(57) ABSTRACT

A method of generating a spread spectrum clock signal in an integrated circuit, the method comprising providing a programmable digital clock generator in programmable logic of the integrated circuit, coupling a user-programmable control signal to the programmable clock generator to control the frequency deviation of the spread spectrum clock signal, and generating the spread spectrum clock signal in response to the user-programmable control signal.

18 Claims, 6 Drawing Sheets

METHOD OF AND CIRCUIT FOR GENERATING A SPREAD SPECTRUM CLOCK SIGNAL

FIELD OF THE INVENTION

The present invention relates generally to integrated circuits, and in particular, to a method of and circuit for generating a spread spectrum clock signal.

BACKGROUND OF THE INVENTION

Integrated circuits are an integral part of any electronic device. A variety of integrated circuits are often used together to enable the operation of the electronic device. While integrated circuits are typically designed for a particular application, one type of integrated circuit which enables flexibility is a programmable logic device (PLD). A PLD is designed to be user-programmable so that users may implement logic designs of their choices. One type of PLD is the Complex Programmable Logic Device (CPLD). A CPLD includes two or more "function blocks" having a two-level AND/OR structure connected together and to input/output (I/O) resources by an interconnect switch matrix. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., FLASH memory, as in some CPLDs), or in any other type of memory cell.

Clock signals are also used for a variety of purposes in digital circuits, both on board level systems and integrated circuit (IC) devices. An integrated circuit such as a PLD typically receives one or more external reference clock signals to generate one or more internal clock signals to operate internal digital circuits. In synchronous systems, global clock signals are used to synchronize various circuits across the board or IC device. While multiple clock generating circuits may be used to generate the multiple clock signals, clock generating circuits typically consume a large amount of chip space. Therefore, most systems use one clock generating circuit to generate a first clock signal called a reference clock signal, and a specialized circuit to derive other clock signals from the reference clock signal. For example, clock dividers are used to generate one or more clock signals of lower clock frequencies from the reference clock signal. Typically, clock dividers divide the frequency of the reference clock signal by an integer value D. Conversely, clock multipliers are used to generate one or more clock signals of higher clock frequencies, for example M times the reference clock signal. Combining clock multipliers with clock dividers provides clock circuits which may generate one or more clock signals having frequencies that are fractional values of the frequency of the reference clock signal, commonly called frequency synthesis. For example, if the generated clock frequency has a ratio of M/D that is 7/2 of the reference clock frequency, then the two clock edges of the generated clock signal and the reference clock signal should be in concurrence every 7 cycles of the generated clock signal and every 2 cycles of the reference clock signal. That is, a pulse train comprising 7 clock cycles of the generated clock signals is compared with a reference pulse train of two clock cycles of the reference clock signal to determine whether the generated clock signal is at the correct frequency, as is well know in the art. A clock signal may also be generated having an M/D ratio of 1, where the generated clock signal would have different properties.than the reference clock signal, such as a spread spectrum clock signal.

Electromagnetic interference (EMI) is electromagnetic radiation which is generated by electrical circuits carrying rapidly changing signals, such as a clock signal. EMI causes unwanted interference or noise to be induced in other circuits, and therefore degrades the performance of the other circuits. Spread-spectrum clock generation is used in the design of synchronous digital systems to reduce the spectral density of the EMI that these clock signals generate. A synchronous digital system is one that is driven by a clock signal and, because of its periodic nature, has a narrow frequency spectrum. In particular, perfect clock signal would have all its energy concentrated at a single frequency. However, such a clock signal may exceed the regulatory limits for electromagnetic interference, such as limits established by the Federal Communications Commission (FCC).

To avoid this problem, spread-spectrum clocking is commonly used to reshape the system's electromagnetic emissions to comply with the electromagnetic compatibility regulations. Spread spectrum clocking spreads the energy of the clock signal over a large frequency band, defined by a frequency deviation, at certain modulation frequencies. Generating a spread spectrum clock signal effectively reduces the electrical and magnetic field strengths that are measured within a narrow window of frequencies within the frequency band. That is, spread-spectrum clocking distributes the energy so that it falls into a large number of the receiver's frequency bands, where there is not enough energy in any one band to exceed the regulatory limits.

A spread spectrum clock signal may be a center spread clock signal, where the frequency of the clock signal varies between a frequency which is greater than the desired generated clock signal and a frequency which is less than the desired generated clock signal. Alternatively, a spread spectrum clock signal may be a side spread clock signal, where the frequency of the clock signal varies between the desired generated clock signal and a frequency which is either greater than or less than the desired generated clock signal. In generating a spread spectrum clock signal, it is desirable to generate the highest energy spread with the lowest frequency deviation.

While spread spectrum clocking is a common technique to gain regulatory approval for a device, conventional circuits for generating a spread spectrum clock signal are often limited. For example, many spread spectrum clocking techniques use phase locked loops (PLLs). Digital circuits used as a front-end of a PLL often increase the "cycle-to-cycle" jitter, commonly defined as the difference in length between any two adjacent clock periods of the clock signal. Conventional devices implementing spread spectrum clocks also provide little flexibility for parameters related to the generated signal. Further, for devices having more than one clock signal, a separate spread spectrum clocking chip may be required for each clock signal.

Accordingly, there is a need for an improved method of and circuit for generating a spread spectrum clock signal.

SUMMARY OF THE INVENTION

A method of generating a spread spectrum clock signal in an integrated circuit is disclosed. The method comprises providing a programmable digital clock generator in the integrated circuit; coupling a user-programmable control signal to the programmable digital clock generator to control the frequency deviation of the spread spectrum clock signal; and generating the spread spectrum clock signal in response to the user-programmable control signal. Coupling a user-programmable control signal to the programmable digital clock generator to control the frequency deviation of the spread spectrum clock signal may comprise coupling a bandwidth control signal and/or a frequency control signal to the programmable digital clock generator.

According to one embodiment, a method of generating a spread spectrum clock signal in an integrated circuit comprises providing a programmable digital clock generator in programmable logic of the integrated circuit; coupling a user-programmable digital control signal to the programmable digital clock generator; determining a frequency deviation between an input signal and a spread spectrum clock signal; generating a frequency adjustment command based upon the frequency deviation and the user programmable control signal; and generating the spread spectrum clock signal in response to the frequency adjustment command. Coupling control signals to the programmable digital clock generator may comprise coupling a bandwidth control signal to a first counter of the programmable digital clock generator coupled to receive a reference clock and/or coupling the bandwidth control signal to a second counter of the programmable digital clock generator coupled to receive the spread spectrum clock signal. The method may further comprise coupling a frequency limit control signal to a frequency adjustment circuit, wherein generating a frequency adjustment command comprises a generating frequency adjustment command based upon a frequency limit control signal.

An integrated circuit having programmable logic is also disclosed. The integrated circuit comprising a first counter coupled to receive a reference clock signal; a second counter coupled to receive a spread spectrum clock signal; a comparator coupled to receive the outputs of the first counter and the second counter and to generate a frequency deviation signal; and a digital frequency synthesizer coupled to the output of said comparator and generating a spread spectrum clock signal based upon the frequency deviation signal and a user programmable control signal. The integrated circuit may further comprise a frequency adjustment circuit coupled to the output of the comparator and generating a frequency adjustment command, wherein the frequency adjustment command is based upon a user programmable frequency limit control signal.

DETAILED DESCRIPTION OF THE DRAWINGS

Figure 1:
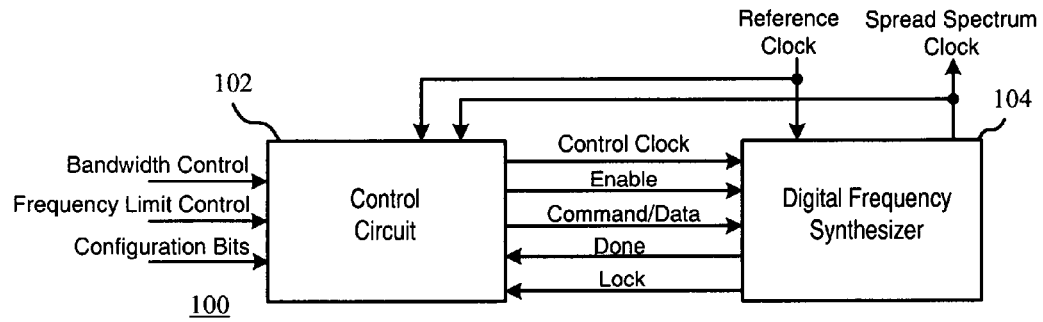
FIG. 1 is a block diagram of a circuit for generating a spread spectrum clock signal according to an embodiment the present invention.

Referring to FIG. 1, a block diagram of a circuit for generating a spread spectrum clock signal according to an embodiment the present invention is shown. The circuit 100 comprises a programmable digital clock generator, where one or more user programmable signals are used to control the frequency deviation of a spread spectrum clock signal. A control circuit 102 is coupled to a digital frequency synthesizer (DFS) 104, which receives a reference clock signal as well as signals from the control circuit, and couples feedback signals to the control circuit. In particular, the control circuit 102 couples a plurality of control signals comprising a control clock signal, an enable signal, and command/data signals. Although a control clock signal is provided, the digital frequency synthesizer may operate on a different clock, such as the reference clock. That is, the control clock signal has no restrictions and may be any type of clock with or without a relationship to the reference clock or the spread spectrum clock, or may be based on the reference clock or the spread spectrum clock. As will be described in more detail below, the digital frequency synthesizer provides a plurality of feedback signals, such as "Done" and "Lock" signals, back to the control circuit 104 indicating a status of the digital frequency synthesizer, as will be described in more detail in reference to FIG. 6. For example, a synchronous serial peripheral interface (SPI) or some other suitable interface may be employed to transfer the various signals between the control circuit and the digital frequency synthesizer. Finally, as will be described in more detail below, the digital frequency synthesizer and control circuit may be implemented on a programmable logic device, such as an FPGA, for example.

According to one embodiment of the invention, the digital frequency synthesizer is integrated with an external control system in a master-slave relationship, where the frequency is changed according to the commands for generating spread spectrum clock. For example, the digital frequency synthesizer may be integrated into an FPGA, such as the FPGA of FIG. 9, and may change output frequency upon the commands of the FPGA fabric without the need for reconfiguration of the FPGA. The control circuit communicates directly with the FPGA fabric, such as through a serial interface, in order to give the FPGA complete control over the synthesized frequency with a "master-slave" relationship. Alternatively, a digital frequency synthesizer according another embodiment of the present invention may be implemented on an integrated circuit, and may be coupled to some external device or system which controls the digital frequency synthesizer according to other embodiments of the present invention. Although programmable logic devices are described by way of example, and provide significant advantages in implementing the various embodiments of the digital frequency synthesizer, the circuits and methods may be employed on any type of integrated circuit or in any type of circuit or system requiring a clock.

Figure 2:
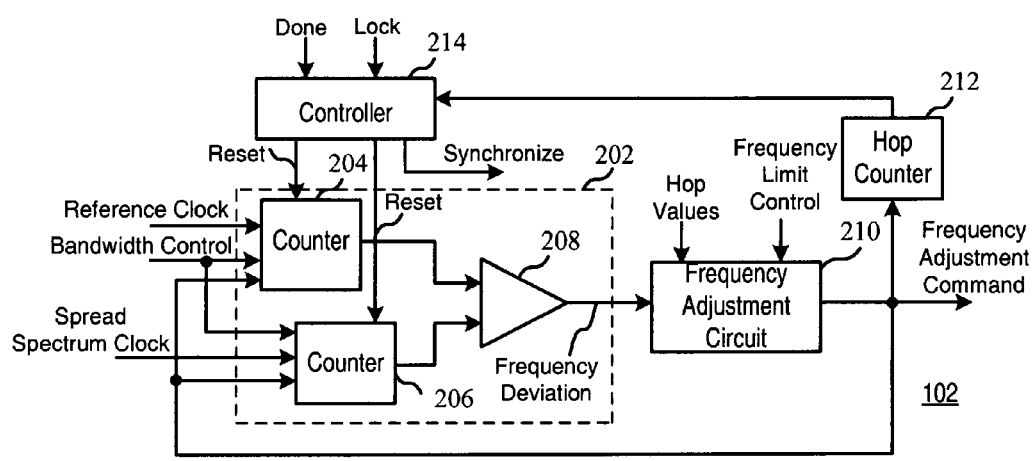
FIG. 2 is a block diagram of a control circuit for generating a spread spectrum clock signal according to an embodiment of the present invention.

Turning now to FIG. 2, a block diagram of a control circuit for generating a spread spectrum clock signal according to an embodiment of the present invention is shown. In particular, a frequency deviation circuit 202 comprises a first counter 204 coupled a reference clock signal, a frequency adjustment command, and a bandwidth control signal. As will be described in more detail below, the bandwidth control signal enables controlling how often the counter generates a count value to determine a frequency deviation of the generated clock signal by comparing the generated clock signal and the reference clock, while the frequency adjustment command represents a change in the M and/or D values. If the M/D ratio for the circuit is 1:1, then the reference signal and the generated clock signal are compared, while pulse trains for the clock signals having the number of pulses corresponding to the M/D ratio would be compared for a generated clock signal having an M/D ratio other than a 1:1 ratio. A second counter 206 is coupled to receive the spread spectrum clock signal, the frequency adjustment command, and the bandwidth control signal. The outputs of the counters 204 and 206 are coupled to a comparator 208 which generates a frequency deviation signal. The frequency deviation signal represents the relative shift between the reference clock and the generated spread spectrum clock.

The frequency deviation signal is coupled to a frequency adjustment circuit 210 which generates the frequency adjustment command signal. The frequency adjustment command signals is coupled to the digital synthesizer of FIG. 1, and commands the digital frequency synthesizer to change the frequency of the generated clock signal, thereby generating a spread spectrum clock signal. The frequency adjustment circuit also receives a frequency limit control signal for determining the amount of variation of the generated clock signal from the reference clock signal. For example, the value of the frequency limit control signal may be expressed in terms of a variation of the generated signal by a certain percentage of the reference signal, or by a certain frequency variation. The frequency adjustment circuit also receives the hop values. That is, when a determination is made to make a frequency hop, the change in frequency is determined by the hop value. For example, if the frequency deviation exceeds some predetermined value based upon the frequency limit control signal, the frequency adjustment circuit will generate a frequency adjustment command based upon the hop values. The hop values determine a next M and/or D value necessary to cause the frequency to change as desired. The frequency adjustment command is used by the digital frequency synthesizer to generate the spread spectrum clock signal. Finally, a hop counter 212 will generate a hop count which is coupled to a controller 214. The hop count represents the number of hops which have occurred. According to one aspect of the circuit of FIG. 2, the hop count may be used to instruct the digital frequency synthesizer to relock to the original frequency. For example, the controller may generate a synchronize command instructing the digital frequency synthesizer to relock to the reference clock signal when generating the spread spectrum clock signal, and then continue to generate the spread spectrum clock signal.

According to the embodiment of the circuit of FIG. 2, various parameters may be programmed to enable generating a spread spectrum clock signal which has desired properties, such as certain EMI in a given frequency range. For example, the bandwidth control signal may be programmed so that the counts associated with the clock signals which are compared are generated at a predetermined rate. Similarly, the frequency control limit may be programmed so that a next hop value is selected based upon the frequency deviation of the generated clock signal from the reference clock signal. The command to perform a next hop may be based upon a determination of a frequency deviation which may be programmed to some predetermined value, such as 2% or 5% of the frequency of the reference clock signal. For example, a frequency deviation may be considered to be fast if the frequency of the spread spectrum clock is 2% greater than the frequency of the reference clock, while the frequency deviation may be considered to be too fast if the frequency of the spread spectrum clock is 5% greater than the frequency of the reference clock. The hop values may also be programmed to achieve a desired spread spectrum clock signal. For example, rather than changing the value of D between 1 and 3 based upon a ratio of 7/2, a clock signal may be based upon an M/D ratio of 14/4, where D is switched between a value of 3 and 5 based upon the hop values.

Figure 3:
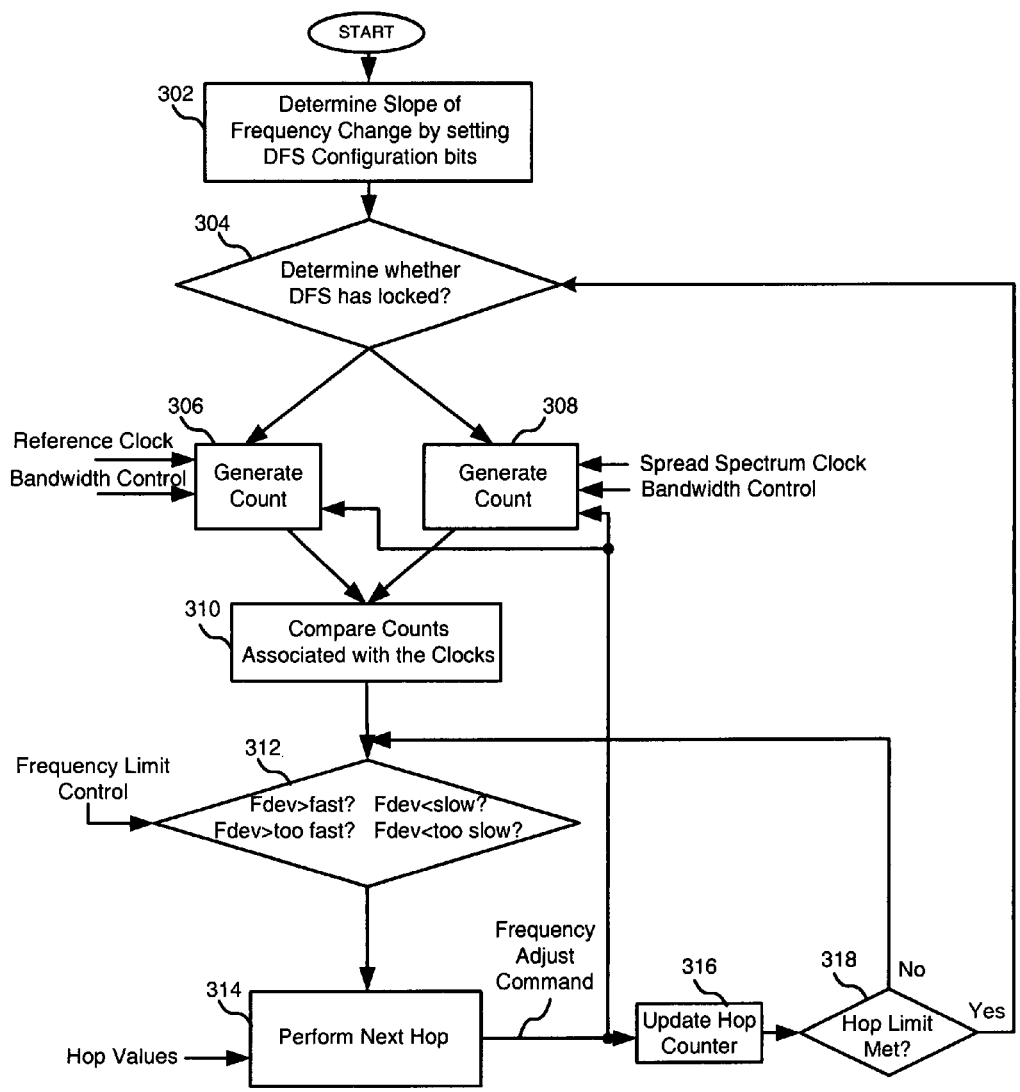
FIG. 3 is a flow chart showing the operation of the control circuit of FIG. 2 according to an embodiment of the present invention.

Turning now to FIG. 3, a flow chart shows the operation of the control circuit of FIG. 2 according to an embodiment of the present invention. The slope of the frequency change is determined by setting configuration bits for the digital frequency synthesizer at a step 302. While it is possible to change either the M or D values associated with the generated clock signals, changing the M value will change the slope of the frequency falling and rising, while changing the D value will provide the same slope for falling and rising, but provides higher modulation frequencies. It is then determined whether the DFS has locked at a step 304. In order to determine whether the generated clock signal, in this case the spread spectrum clock signal, is correct, it is necessary to compare a pulse train of the reference clock signal with a pulse train of the spread spectrum clock signal. Accordingly, after the DFS has locked, a first count will be generated based upon the reference clock signal at a step 306 and a second count will be generated based upon the spread spectrum clock signal at step 308. The counts associated with the clocks will be compared at step 310, where the comparison of the counts will represent a frequency deviation of the spread spectrum clock signal from the reference clock signal.

The frequency deviation will then be analyzed based upon a frequency limit control value at a step 312. In particular, the frequency deviation will be analyzed to determine whether the frequency deviation indicates that the spread spectrum clock signal is greater than some predetermined fast signal, in which case a frequency hop according to a first hop value will be performed. That is, if the frequency deviation indicates that the frequency of the spread spectrum clock signal is faster than the desired frequency of the generated clock signal, the hop will be made to decrease the generated clock signal. For example, the desired frequency of the generated clock signal would be the center frequency in a center frequency spread spectrum clock signal. Similarly, if the frequency deviation indicates that the frequency of the spread spectrum clock signal is slower than some predetermined slow signal, a frequency hop will be performed according to some other hop value to increase the frequency of the generated clock signal. However, if the frequency deviation is determined to be greater than a value which indicates that the frequency of the generated clock signal is too fast, or less than a value which indicates that the frequency of the generated clock signal is too slow, the frequency hop value will be reset to the center frequency.

By way of example, when generating a frequency having an M/D ratio of 7/2, the hopping to increase or decrease the frequency of the generated clock signal may include switching between of D value of 1 to increase the frequency and a D value of 3 to decrease the frequency. However, the value of D may be selected to be 2 if the frequency of the generated clock signal is determined to be too high or too low. Accordingly, the hop is then performed at a step 314 based upon the evaluation of the frequency deviation and hop values. As set forth above, the hop values which indicate the selection of a different M and/or D values to generate a next frequency, which may be a higher frequency or a lower frequency.

The frequency adjustment command, which is provided to the digital frequency synthesizer to generate the spread spectrum clock signal, is generated and provided to the counter which generates the count based upon the number of opportunities to hop when generating the spread spectrum clock signal. After a hop counter is updated at a step 316, it is then determined whether a hop limit, representing a maximum number of hops made by the control circuit, has been reached at a step 318. If not, the frequency deviation will continue to be analyzed at step 312. If the hop limit has been reached, the DFS will attempt to lock to the reference clock signal again to ensure that the generated clock signal comprises a spread spectrum clock signal which is correctly generated, either as a center spread signal or a side spread clock signal, with respect to the desired generated clock signal.

A CD ROM having code for implementing a method of generating a spread spectrum clock signal according to circuit of FIG. 2 and the flow chart of FIG. 3 according to one aspect of the present invention is attached as a part of this application. The code reproduced in this patent document contains material subject to copyright protection. The copyright owner of that material has no objection to the facsimile reproduction of the patent document or the patent disclosure, as it appears in the Patent and Trademark Office patent files or records, but otherwise reserves all copyright rights.

Figure 4:
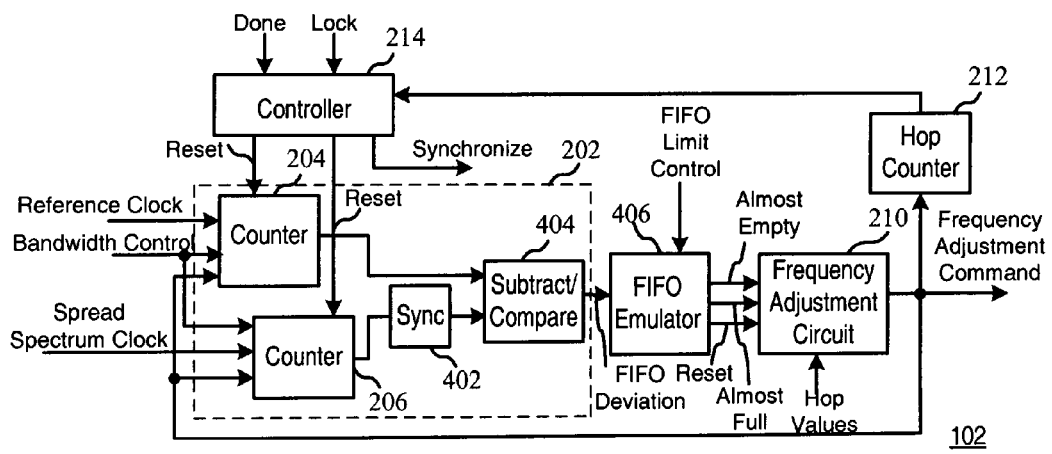
FIG. 4 is a block diagram of a control circuit for generating a spread spectrum clock signal according to an alternate embodiment of the present invention.

Turning now to FIG. 4, a block diagram of a control circuit for generating a spread spectrum clock signal according to an alternate embodiment of the present invention is shown. According to the embodiment of FIG. 4, the output of the counter 204 and a synchronized output of the counter 206 generated by synchronizer circuit 402 is coupled to a subtract and compare circuit 404. The synchronizer circuit 402 may comprise a pair of registers to synchronize the clock signals in a different clock domain, as is well known in the art.

The subtract and compare circuit 404 generates a FIFO deviation signal based upon a virtual FIFO emulator 406. In order to generate a frequency adjustment command, a FIFO emulator 406 receives a FIFO deviation signal and will determine, based upon the spread spectrum clock, whether a FIFO implemented in the device would be almost full or almost empty, in which case a frequency hop would be performed. The frequency deviation of the spread spectrum clock signal is represented by a FIFO value. The FIFO emulator would generate an almost full signal if the spread spectrum clock has a frequency which may be faster than the desired frequency such that a FIFO of the device would overflow based upon the FIFO limit control signals. Similarly, the FIFO emulator would generate an almost empty signal if the spread spectrum clock has a frequency which may be slower than the desired frequency such that a FIFO of the device would underflow based upon the FIFO limit control signals. That is, the FIFO limit control signals may be used to establish when an Almost Full or Almost Empty signal is generated. Accordingly, the frequency of the spread spectrum clock signal is adjusted based upon the state of a FIFO emulator.

Figure 5:
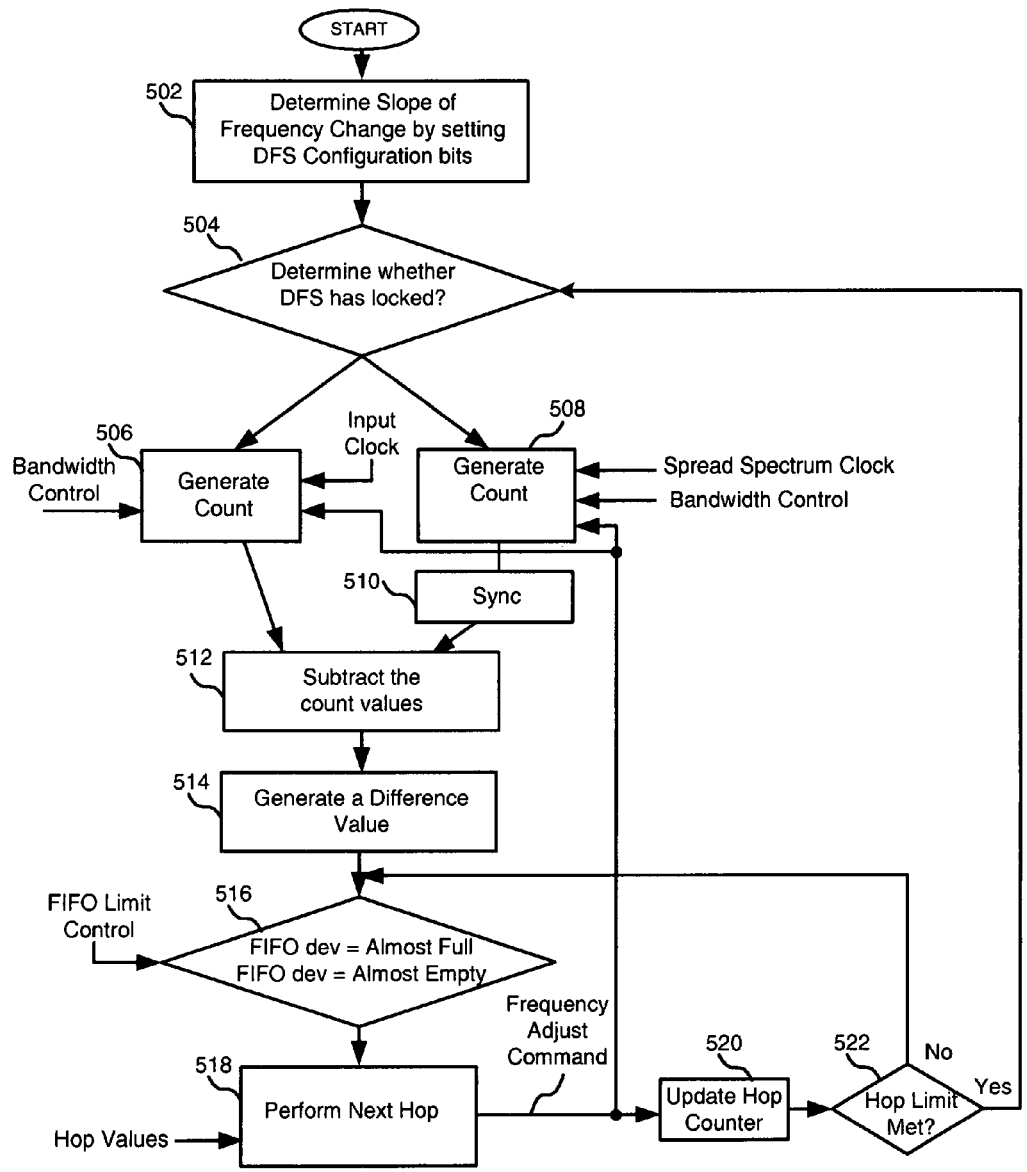
FIG. 5 is a flow chart showing the operation of the control circuit of FIG. 4 according to an embodiment of the present invention.

Turning now to FIG. 5, a flow chart shows the operation of the control circuit of FIG. 4, according to an embodiment of the present invention. The slope of the frequency change is determined by setting configuration bits for a digital frequency synthesizer at a step 502. It is then determined whether the digital frequency synthesizer has locked at a step 504. After the digital frequency synthesizer has locked, a first count will be generated based upon the reference clock at a step 506 and a second count will be generated based upon the spread spectrum signal at a step 508. The count generated at step 508 is then synchronized with the clock domain of the reference clock at a step 510. The counts associated with the clocks are then subtracted at step 512, and compared at step 514, where the difference of the counts will represent a FIFO deviation of a FIFO emulator.

The FIFO deviation will then be analyzed based upon a FIFO limit control signal at a step 516. In particular, the FIFO deviation will be analyzed to determine whether the FIFO deviation indicates that the spread spectrum clock signal is greater than some predetermined fast signal such that a FIFO in the device would be filling up quickly, and an almost full signal would be generated. In this case, a frequency hop according to a first hop value will be performed. Similarly, if the FIFO deviation indicates that the spread spectrum clock signal is slower than some predetermined slow signal, an almost empty clock signal would be generated and a frequency hop will be performed according to some other hop value.

However, if the FIFO deviation is determined to be greater than a value which is too fast, or less than a value which is too slow, a reset signal may optionally be generated and the frequency hop value will be reset to the center frequency. The hop is then performed at a step 518 based upon the evaluation of the FIFO deviation and hop values. A frequency adjustment command may optionally be provided to the hop counter which generates the count based upon the spread spectrum clock signal. A hop counter is updated at a step 520. It is then determined whether a hop limit has been reached at a step 522. If not, the FIFO deviation will continue to be analyzed at step 516. If the hop limit has been reached, the digital frequency synthesizer will attempt to lock to the reference clock signal again.

Figure 6:
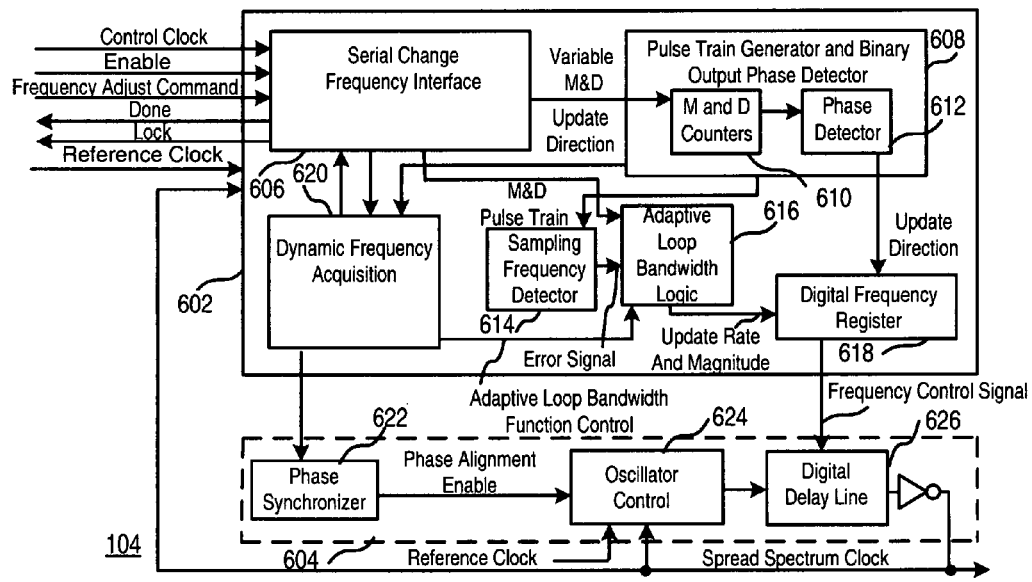
FIG. 6 is a block diagram of a digital frequency synthesizer according to an embodiment of the present invention.

Turning now to FIG. 6, a block diagram of a digital frequency synthesizer according to an embodiment of the present invention is shown. In particular, the circuit of FIG. 6 enables dynamic frequency synthesis, and in particular, dynamically changing the output frequency of a programmable digital frequency synthesizer, wherein the frequency of the output clock is changed while the output clock is still valid. The circuit also provides adaptive loop bandwidth control to optimize the transition from an initial frequency to a next frequency and all subsequent frequencies. The circuit of FIG. 6 receives a reference clock and generates a spread spectrum clock with a dynamically controllable (M/D) frequency ratio. When implemented in an FPGA, no full-FPGA reconfiguration is needed, and the M and D values of the digital frequency synthesizer may be changed, where a dynamic frequency acquisition state machine locks onto the newly desired frequency.

Referring specifically to FIG. 6, an oscillator control portion 602 is coupled to receive the control signals including the frequency adjustment command from the control circuit 102, and couple variable M and D values to control a clock generator 604. The control signals are coupled to a serial change frequency interface 606. The interface preferably uses three separate commands to communicate with the frequency synthesizer. In particular, two command signals (i.e. an enable signal and a command/data signal such as a frequency adjustment command) are coupled to the digital frequency synthesizer, and acknowledge information is received from the digital frequency synthesizer (i.e. done, lock). The variable M and D values are frequency synthesizer values coupled to a Pulse Train Generator and Binary Output Phase Detector 608, which comprises M and D counters 610 and a Phase Detector 612. M and D pulse trains, representing the number of pulses of the reference clock and the generated clock, are coupled to a sampling frequency detector 614.

The sampling frequency detector 614 generates an error signal which is coupled to an adaptive loop bandwidth logic block 616. The sampling frequency detector detects differences from the desired frequency, based upon a new M or D value, and the current frequency to generate the error signal. The error signal enables the adaptive loop bandwidth mechanism to select the best frequency control signal for the digital delay line so that the digital frequency synthesizer will quickly lock to the reference frequency. The adaptive loop bandwidth logic block 616 outputs update values, such as one or more update rates and update magnitudes to a digital frequency register 618. Alternatively, the adaptive loop bandwidth logic block 616 may receive control signals from other elements of the system by way of the serial change frequency interface 606 to select the correct update rate and magnitude values. As will be described in more detail in reference to FIG. 9, the digital frequency register 618 receives update rate, update magnitude and update direction signals, and outputs delay values for one or more digital delay lines of the digitally controllable oscillator 604.

The adaptive loop bandwidth logic block 616 changes the digital loop bandwidth to optimize the frequency transition behavior of the circuit. In general, the adaptive bandwidth logic block increases the update rate and the update magnitude when there are large differences in frequency, and decreases the update rate and the update magnitude when there are small differences in frequency, in response to the error signal. The update rates and/or update magnitudes may be controlled non-linearly. The adaptive loop bandwidth logic block enables flexible processing of the error signals, and therefore the frequency transition behavior may be tuned to give different characteristics.

A dynamic frequency acquisition block 620 is also coupled to receive signals from the serial change frequency interface, as well as an update direction signal from the Pulse Train Generator and Binary Output Phase Detector 608. The dynamic frequency acquisition block 620 controls the clock generator 604 to enable phase alignment, as well as provides adaptive bandwidth function control signals to the adaptive loop bandwidth logic block 616. Accordingly, the frequency transition incorporates an adaptive digital loop bandwidth that allows the frequency transition to be quick and also minimizes frequency overshoot. The digital loop filter reacts with quicker frequency transition (for higher bandwidths) or with slower frequency transition (for lower bandwidths) depending on the relation between the current output frequency and the desired output frequency, the mode of frequency acquisition (e.g. hard phase aligned or frequency aligned operation), and the current state of the acquisition procedure. Additional details related to the operation of the adaptive loop bandwidth logic 616 and the dynamic frequency acquisition block 620 may be found in U.S. patent application Ser. No. 11/170,020 entitled "A Circuit for and Method of Changing a Frequency in a Circuit" filed on Jun. 29, 2005, the entire application of which is incorporated herein by reference.

The clock generator 604 may comprise a phase synchronizer 622 which couples a phase alignment enable signal to an oscillator control circuit 624. Finally, a digital delay line 626 is coupled to receive the output of an oscillator control circuit 624 and a delay select value from the digital frequency register 618. The digital delay line may be, for example, a counter-controlled delay, as described for example in U.S. Pat. No. 7,071,751 to Alireza S. Kaviani, the entire patent of which is incorporated herein by reference. Accordingly, the circuit of FIG. 6 is fully digital and provides improved area and power efficiency, yet it does not increase cycle-to-cycle jitter. Further, the circuit provides a lower modulation frequency compared to traditional PLL solutions.

Figure 7:
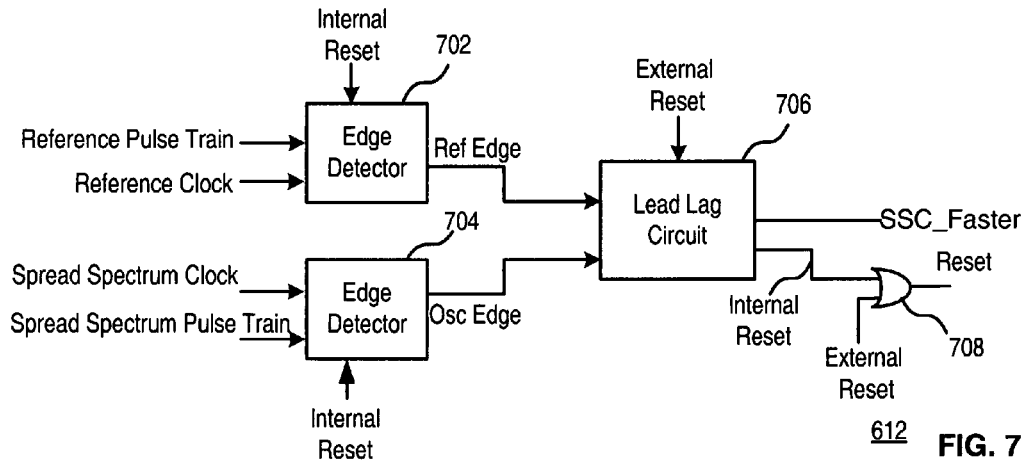
FIG. 7 is a block diagram of a phase detector employed in the circuit of FIG. 6 according to an embodiment of the present invention.

Turning now to FIG. 7, a block diagram of a phase detector employed in the circuit of the embodiment illustrated in FIG. 6 is shown. The phase detector of FIG. 7 comprises a level mode phase detector that generates a binary output signal identifying the direction that the generated clock frequency has to change to reach the desired frequency. The phase detector 612 includes edge detector 702 for the reference pulse train, an edge detector 704 for the generated pulse train, and a lead-lag state machine 706. Phase detector 612 is responsive to the reference clock signal, the spread spectrum clock signal, a concurrence signal reference pulse train, and a concurrence signal spread spectrum (SS) pulse train. Phase detector 612 generates a control signal SS_Faster which may be a binary error signal. For example, when the spread spectrum clock signal is leading the reference clock signal, an active control signal SSC_Faster is generated. Conversely, when spread spectrum clock signal is lagging the reference clock signal, an inactive control signal SSC_Faster is generated. The control signal SSC_Faster may be used to guide clock generator 604 to produce a spread spectrum clock signal having a frequency and phase such that spread spectrum clock signals and the reference clock signal are synchronized. The spread spectrum pulse train and reference pulse train concurrence signals act as gate signals to control the timing of phase comparisons between the reference clock and the spread spectrum clock signals, as described in more detail below.

In particular, edge detector 702 is responsive to the reference clock signal and the concurrence signal reference pulse train. Similarly, edge detector 704 is responsive to spread spectrum clock signal and concurrence signal spread spectrum pulse train. Edge detector 702 generates an edge detection signal REF_EDGE, and edge detector 704 generates an edge detection signal OSC_EDGE. When the reference concurrence signal is in an active state, edge detector 702 drives edge detection signal REF_EDGE to the active state when the next edge of reference clock signal arrives. When spread spectrum concurrence signal is in the active state, edge detector 704 drives edge detection signal OSC_EDGE to the active state when the next edge of the oscillator clock arrives. Edge detectors 702 and 704 may be configured to detect positive edges of the clock signals or negative edges of the clock signals.

Edge detectors 702 and 704 may be asynchronous level-mode sequential circuits, for example, and asynchronously detect the next edge of their respective clock signals when their respective concurrence signals are in the active state. Thus, a level-change in a clock signal and/or a concurrence signal will cause a change in state of the edge detection signal and/or one or more internal signals in a given edge detector. A Lead-lag circuit 706 is responsive to edge detection signals REF_EDGE and OSC_EDGE. Lead-lag circuit 706 preferably incorporates asynchronous level-mode sequential circuitry in order to determine which of the clock signals is leading. If an edge of reference clock signal is detected first, lead-lag circuit 706 drives control signal SSC_Faster to the active state. If an edge of reference clock input signal is detected, lead-lag circuit 806 drives control signal SSC_ faster to the inactive state.

After each phase comparison, lead-lag circuit 706 drives an internal reset signal to an active state. The internal reset signal is coupled to edge detectors 702 and 704 in order to reset edge detection signals REF_EDGE and OSC_EDGE, respectively, to an inactive state. In one embodiment, an external reset signal is coupled to lead-lag circuit 706. If the external reset signal is used, the internal reset signal is coupled to an OR gate 708 along with the external reset signal. If either the internal reset signal or the external reset signal is in the active state, the edge detectors will be reset. Operation of the phase detector 612 is described in more detail U.S. Pat. No. 6,756,822, the entire patent of which is incorporated herein by reference.

Figure 8:
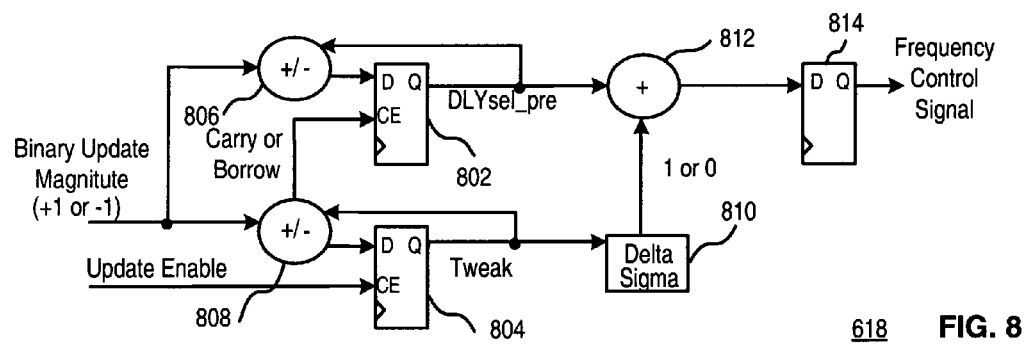
FIG. 8 is a block diagram of digital frequency register employed in the circuit of FIG. 6 according to an embodiment of the present invention.

Turning now to FIG. 8, a block diagram of digital frequency register according to an embodiment of the present invention is shown. The digital frequency register 618, which holds the digital representation of the period of the clock signal generated by the clock generator, comprises an oscillator control circuit having a delay select register 802 and a tweak register 804. The update enable signal is a clock enable for the tweak register 804, and the update magnitude is an addition or subtraction (+1 or −1) depending on the input error signal. The tweak register receives an update enable signal, and an output of the tweak register is also coupled to the adder/subtractor circuit 808 and a delta sigma circuit 810. The output of the tweak register may be the least significant bits of the clock period selection signal. Finally, an adder 812 adds the output of the delay select register signal and the output of the delta sigma circuit, and couples the sum to a register 814 which generates the frequency control signal. Accordingly, the tweak register provides the least significant bits of the frequency control signal, where the frequency control signal comprises a DLYsel_pre portion provided by the delay select register and a fractional portion provided by the tweak register.

Figure 9:
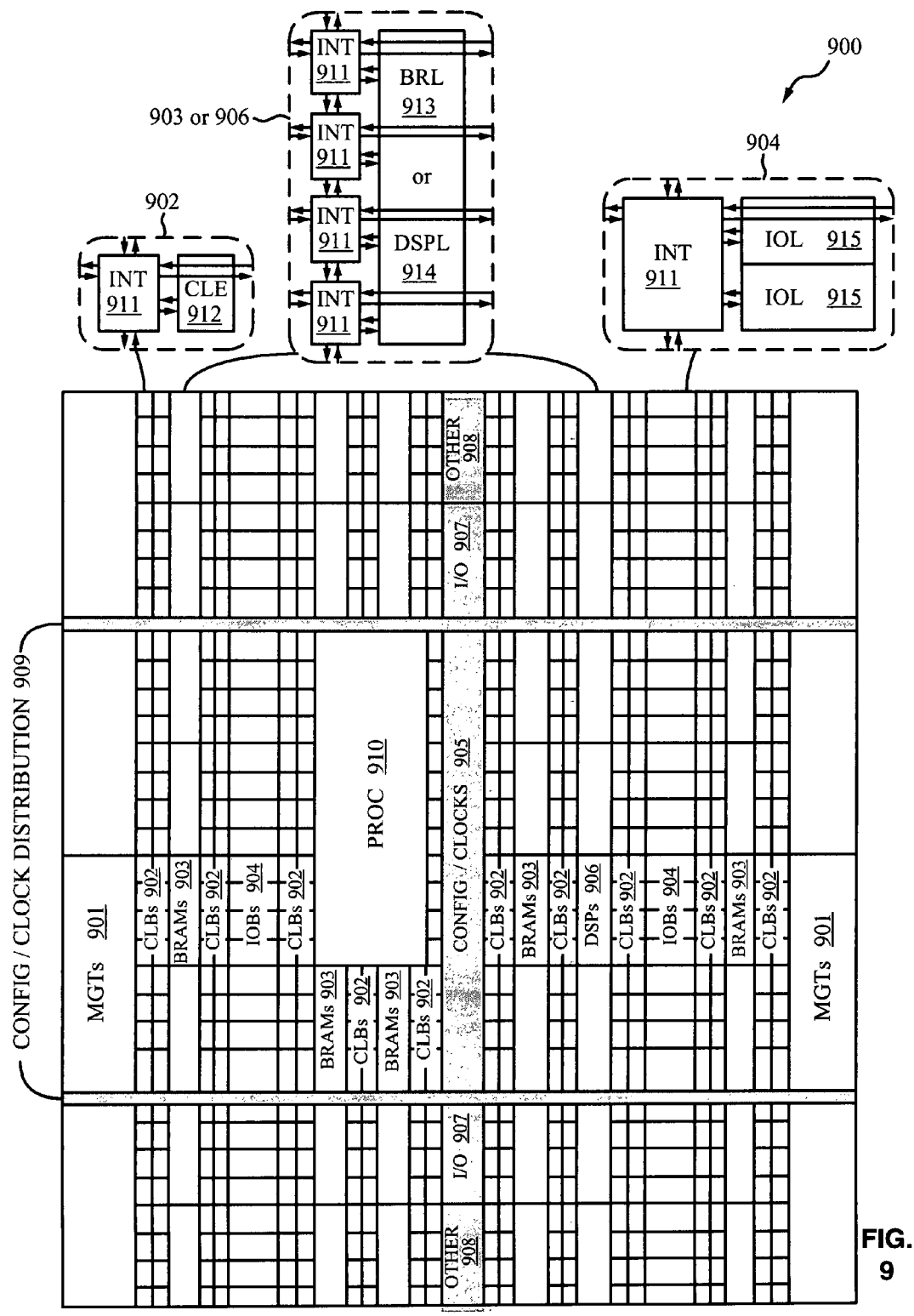
FIG. 9 is a block diagram of a programmable logic device implementing a circuit for generating a spread spectrum signal according to an embodiment of the present invention.

Turning now to FIG. 9, a block diagram of a programmable logic device implementing a circuit, such as the circuit of FIG. 1, for generating a spread spectrum signal according to an embodiment of the present invention is shown. The FPGA architecture 900 of FIG. 9 includes a large number of different programmable tiles including multi-gigabit transceivers (MGTs 901), configurable logic blocks (CLBs 902), random access memory blocks (BRAMs 903), input/output blocks (IOBs 904), configuration and clocking logic (CONFIG/CLOCKS 905), digital signal processing blocks (DSPs 906), specialized input/output blocks (I/O 907) (e.g., configuration ports and clock ports), and other programmable logic 908 such as digital clock managers, analog-to-digital converters, system monitoring logic, and so forth. Some FPGAs also include dedicated processor blocks (PROC 910). The programmable elements and programmable control signals of the circuit of FIGS. 1-7 may be implemented based upon configuration bits of a configuration bitstream downloaded to the FPGA.

In some FPGAs, each programmable tile includes a programmable interconnect element (INT 911) having standardized connections to and from a corresponding interconnect element in each adjacent tile. Therefore, the programmable interconnect elements taken together implement the programmable interconnect structure for the illustrated FPGA. The programmable interconnect element (INT 911) also includes the connections to and from the programmable logic element within the same tile, as shown by the examples included at the top of FIG. 9.

For example, a CLB 902 may include a configurable logic element (CLE 912 that may be programmed to implement user logic plus a single programmable interconnect element (INT 911). As will be described in more detail below, the values stored in the lookup table may be stored in configuration memory elements, often called distributed RAM, which are inputs to the multiplexer tree. A BRAM 903 may include a BRAM logic element (BRL 913) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 906 may include a DSP logic element (DSPL 914) in addition to an appropriate number of programmable interconnect elements. An IOB 904 may include, for example, two instances of an input/output logic element (IOL 915) in addition to one instance of the programmable interconnect element (INT 911).

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the FPGA. Some FPGAs utilizing the architecture illustrated in FIG. 9 include additional logic blocks that disrupt the regular columnar structure making up a large part of the FPGA. The additional logic blocks may be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear, to facilitate the efficient implementation of user logic. Similarly the circuits and methods of the present invention may be implemented in any device, including any type of integrated circuit having programmable logic.

Figure 10:
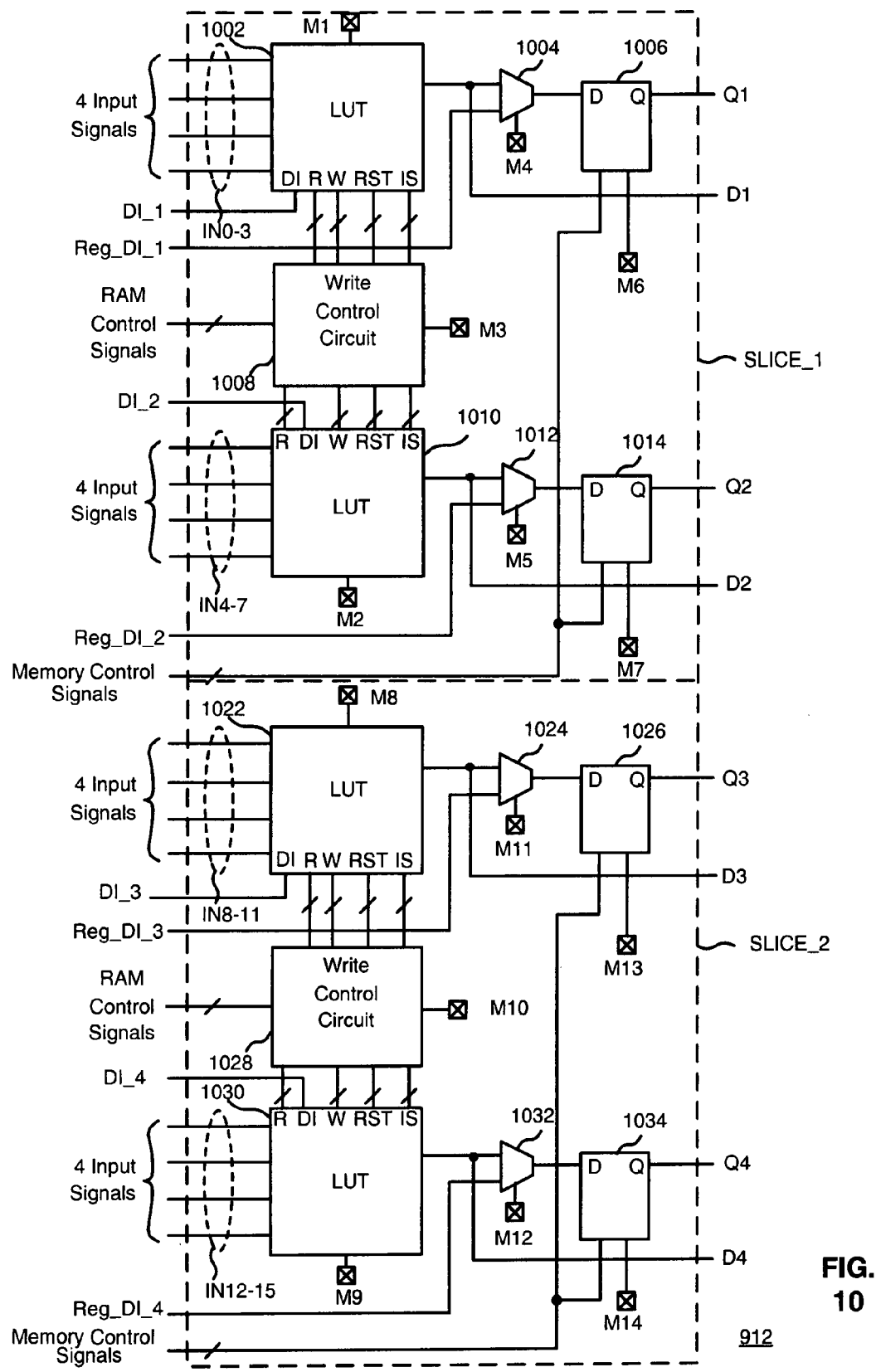
FIG. 10 is a block diagram of a configurable logic element of the programmable logic device of FIG. 9 according to an embodiment the present invention.

Finally, turning to FIG. 10, a block diagram of a configurable logic element of the programmable logic device of FIG. 9 according to an embodiment the present invention is shown. In particular, FIG. 10 illustrates in simplified form a configurable logic element 912 of a configuration logic block 902 of FIG. 9. The configurable logic element shown comprises two similar slices, where each slice comprises a pair of function generators. However, the configurable logic element may comprise more slices, such as four slices, for example. Each function generator may function in any of several modes depending upon the configuration data in the configuration memory elements M1-M14.

When in RAM mode, input data is supplied by input terminals DI_1 and DI_2 to the data input (DI) terminal of the associated function generator. Each function generator, which may comprise a lookup table, provides an output signal to an associated multiplexer, which selects between the output signal of the function generator and an associated register direct input signal Reg_DI_1 or Reg_DI_2 from the programmable interconnect element. Thus, each function generator may be optionally bypassed.

When in a look-up table mode, each function generator implemented as a look-up table has four data input signals IN0-3 which will address one of eight memory elements of the LUT. The memory elements of the LUT are stored with data provided to the programmable logic device as a part of a configuration bitstream. Slice 1 comprises a function generator implemented as a LUT 1002 coupled to a multiplexer 1004. In particular, the LUT 1002 receives 4 input signals which are decoded to generate an output D1 associated with data stored in the LUT at the address designated by the input signals. The multiplexer 1004 is adapted to receive the output of LUT 1002 and a registered value of Reg_DI_1. The output of the multiplexer 1004 is coupled to a register 1606 which generates an output Q1.

A Write Control Circuit 1008 is coupled to receive RAM control signals and generate signals to control the LUT 1002. In addition to a data input (DI) coupled to receive DI_1 and conventional read and write control signals coupled to a read enable input (R) and a write enable input (W), respectively, the LUT 1002 comprises a partial reset input (RST) for receiving a partial reset signal, and an initial state input (IS) for receiving an initial state signal. Such resetting of the memory elements enables resetting the LUT memory cells during a partial reconfiguration of a programmable logic device, including partial reconfiguration of a device during operation. One advantage of resetting LUT memory elements of a device during partial reconfiguration is that it is not necessary to cycle through the required clock cycles to set the correct data after the partial reconfiguration. Similarly, slice 1 comprises a function generator implemented as a LUT 1010 coupled to a multiplexer 1012. The LUT 1010 is adapted to receive input signals IN4-7, while the multiplexer 1012 is coupled to receive the output D2 of the LUT 1010 and the registered input value Reg_DI_2. The output of the multiplexer 1012 is coupled to a register 1014 which generates an output Q2. The write control circuit 1008 also generates a partial reset signal and an initial state signal for selectively resetting or setting one or more of the bits of the LUT 1010.

Similarly, slice 2 comprises a function generator implemented as a LUT 1022 coupled to a multiplexer 1024. The LUT 1022 is adapted to receive input signals IN8-11, while the multiplexer 1024 is coupled to receive the output of the LUT 1022 and a registered input value Reg_DI_3. The output of the multiplexer 1024 is coupled to a register 1026 which generates an output Q3. A Write Control Circuit 1028 is coupled to receive RAM control signals and generate signals to control the LUT 1022. In particular, input signals IN8-IN11 are decoded to generate an output D3 associated with data stored in the LUT at the address designated by the input signals. The LUT 1022 comprises a partial reset input (RST) for receiving a partial reset signal, and an initial state input (IS) for receiving an initial state signal. Similarly, slice 2 comprises a function generator implemented as a LUT 1030 coupled to a multiplexer 1032. The LUT 1030 is adapted to receive input signals IN12-15, while the multiplexer 1032 is coupled to receive the output D4 of the LUT 1030 and a registered input value Reg_DI_4. The output of the multiplexer 1032 is coupled to a register 1034 which generates an output Q4. The write control circuit 1028 also generates a partial reset signal and an initial state signal for selectively resetting or setting one or more of the bits of the LUT 1030.

It can therefore be appreciated that the new and novel method of and circuit for generating a spread spectrum signal has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A method of generating a spread spectrum clock signal in an integrated circuit, the method comprising:
   providing a programmable digital clock generator in the integrated circuit;
   coupling a user-programmable control signal to the programmable digital clock generator to control frequency deviation of the spread spectrum clock signal, wherein the user-programmable control signal determines an allowable variation between the spread spectrum clock signal and a reference clock signal;
   generating a frequency adjustment command if a determined variation between the spread spectrum clock signal and the reference clock signal exceeds a predetermined value; and
   generating the spread spectrum clock signal in response to the frequency adjustment command.

2. The method of claim 1 further comprising coupling a bandwidth control signal to the programmable digital clock generator.

3. The method of claim 1 wherein coupling a user-programmable control signal to the programmable digital clock generator comprises coupling a frequency control limit signal to the programmable digital clock generator.

4. The method of claim 1 wherein generating the spread spectrum clock signal in response to the frequency adjustment command comprises generating a center spread clock signal based upon a reference clock signal.

5. The method of claim 1 further comprising coupling hop signals to the programmable digital clock generator.

6. The method of claim 5 wherein generating the spread spectrum clock signal comprises generating the spread spectrum clock signal in response to the hop signals.

7. The method of claim 6 further comprising generating a synchronization signal to relock to a reference frequency.

8. A method of generating a spread spectrum clock signal in an integrated circuit, the method comprising:
   providing a programmable digital clock generator in programmable resources of the integrated circuit;
   coupling a user-programmable bandwidth control signal to the programmable digital clock generator;
   determining, in response to the user-programmable bandwidth control signal, a frequency deviation of the spread spectrum clock signal output by the programmable digital clock generator with respect to a reference clock signal;
   generating a frequency adjustment command based upon the frequency deviation; and
   generating the spread spectrum clock signal in response to the frequency adjustment command.

9. The method of claim 8 wherein coupling a user-programmable bandwidth control signal comprises coupling the user-programmable bandwidth control signal to a first counter of the programmable digital clock generator coupled to receive the reference clock signal and to a second counter of the programmable digital clock generator coupled to receive the spread spectrum clock signal.

10. The method of claim 9 wherein determining a frequency deviation comprises determining a frequency deviation based upon a comparison of a count of the first counter with a count of the second counter.

11. The method of claim 10 further comprising coupling a frequency limit control signal to a frequency adjustment circuit, wherein generating a frequency adjustment command comprises generating a frequency adjustment command based upon the frequency limit control signal.

12. The method of claim 11 further comprising coupling frequency hop values to the frequency adjustment circuit, wherein generating a frequency adjustment command comprises generating a frequency adjustment command based upon the frequency hop values.

13. The method of claim 12 further comprising counting a number of times a frequency of the spread spectrum clock signal has been adjusted.

14. The method of claim 13 further comprising relocking to a frequency of the reference clock signal after the frequency of the spread spectrum clock signal has been adjusted a predetermined number of times.

15. An integrated circuit having programmable resources, the integrated circuit comprising:
- a digital frequency synthesizer adapted to generate a spread spectrum clock signal;
- a first counter coupled to receive a reference clock signal;
- a second counter coupled to receive the spread spectrum clock signal;
- a comparator coupled to receive outputs of the first counter and the second counter and to generate a frequency deviation signal that represents a variation between the spread spectrum clock signal and the reference clock signal; and
- a frequency adjustment circuit coupled to an output of the comparator and generating a frequency adjustment command that is based upon a user programmable control signal;
- wherein the digital frequency synthesizer is coupled to an output of the frequency adjustment circuit and generates the spread spectrum clock signal based upon the frequency adjustment command.

16. The integrated circuit of claim 15 further comprising a frequency adjustment counter coupled to the output of the frequency adjustment circuit.

17. The integrated circuit of claim 16 further comprising a controller coupled to the frequency adjustment counter, the controller enabling relocking to the reference clock signal after a count of the frequency adjustment counter reaches a maximum value.

18. The integrated circuit of claim 15 wherein the integrated circuit comprises a programmable logic device.

* * * * *